(12) United States Patent
Arnault

(10) Patent No.: US 9,010,514 B2
(45) Date of Patent: Apr. 21, 2015

(54) CLUTCH RELEASE BEARING DEVICE

(75) Inventor: Benoit Arnault, Saint Cyr sur Loire (FR)

(73) Assignee: Aktiebolaget SKF (SE)

( * ) Notice: Subject to any disclaimer, the term of this patent is extended or adjusted under 35 U.S.C. 154(b) by 420 days.

(21) Appl. No.: 13/497,837

(22) PCT Filed: Sep. 20, 2010

(86) PCT No.: PCT/EP2010/063785
§ 371 (c)(1),
(2), (4) Date: Sep. 10, 2012

(87) PCT Pub. No.: WO2011/036115
PCT Pub. Date: Mar. 31, 2011

(65) Prior Publication Data
US 2013/0001038 A1    Jan. 3, 2013

(30) Foreign Application Priority Data
Sep. 23, 2009  (FR) ...................................... 09 56559

(51) Int. Cl.
*F16D 23/14*    (2006.01)
(52) U.S. Cl.
CPC .................................... *F16D 23/146* (2013.01)
(58) Field of Classification Search
USPC ................ 192/98, 110 B; 384/611, 612, 495
See application file for complete search history.

(56) References Cited

U.S. PATENT DOCUMENTS

| | | | | |
|---|---|---|---|---|
| 3,741,361 A | * | 6/1973 | Brandenstein | 192/110 B |
| 4,033,440 A | * | 7/1977 | Ladin | 192/98 |
| 4,883,154 A | * | 11/1989 | Drewes et al. | 192/98 |
| 2006/0081439 A1 | * | 4/2006 | Winkelmann et al. | 192/98 |

FOREIGN PATENT DOCUMENTS

| | | |
|---|---|---|
| DE | 19912432 A1 | 9/1999 |
| DE | 102006048884 A1 | 4/2008 |
| DE | 102007010935 A1 | 9/2008 |
| FR | 2109947 A5 | 5/1972 |
| FR | 2868492 A1 | 10/2005 |
| FR | 2883347 A1 | 9/2006 |
| FR | 2887312 A1 | 12/2006 |

\* cited by examiner

*Primary Examiner* — Robert Hodge
*Assistant Examiner* — Ryan Dodd
(74) *Attorney, Agent, or Firm* — Bryan Peckjian; SKF USA Inc. Patent Dept.

(57) ABSTRACT

The clutch release bearing device comprising a bearing 12 provided with a non-rotating ring 18, a rotating ring 20 and at least one row of rolling elements 22 arranged between the rings, and a wear ring 44 arranged on the rotating ring and capable of coming into contact with a clutch mechanism diaphragm, the wear ring 44 comprising at least one ball joint 84 bearing against a guide portion 42; 92 of the rotating ring and of which the axis 90 may be angularly tilted relative to the axis 14 of the bearing. The wear ring 44 is provided with a guide portion 80 comprising an internal surface in contact with an external bearing surface of the rotating ring, the ball joint 84 and joining portions 86; 94 capable of permitting angular tilting of the ball joint relative to the guide portion.

15 Claims, 5 Drawing Sheets

CLUTCH RELEASE BEARING DEVICE

CROSS-REFERENCE

This application is the US national stage of International Application No. PCT/EP2010/063785 filed on Sep. 20, 2010, which claims priority to French Application No. FR 0956559 filed Sep. 23, 2009.

FIELD OF THE INVENTION

The present invention relates to the field of clutch release bearings for acting on the diaphragm of a clutch, in particular for an automotive vehicle.

BACKGROUND OF THE INVENTION

Such devices comprise a bearing of which one of the rings rotates and the other is fixed, the rotating ring being provided with a radial leading surface for coming into contact with the end of the fingers forming the diaphragm of the clutch. Between the rotating ring and the fixed ring are arranged rolling elements distributed evenly in the circumferential direction by means of a cage.

A non-rotating operating element supports the bearing and, by the action of a control member (mechanical, electrical or hydraulic), causes the thrust bearing to be displaced axially to make the leading surface of the rotating ring bear against the diaphragm of the clutch and to activate the clutch mechanism or system.

A self-centring element is generally interposed between the fixed ring of the bearing and the operating element, said self-centring element providing the axial connection between said two parts, whilst permitting, by its elasticity, a relative radial displacement therebetween. The bearing may thus be displaced in order to achieve a radial alignment of the rotational axes of the bearing and of the diaphragm, so as to be self-centred thereon.

In order to limit wear by friction between the fingers of the diaphragm and the leading surface of the rotating ring when releasing the clutch and engaging the clutch, it is possible to provide a wear ring made of synthetic material on said leading surface. For further details, reference could be made, for example, to the patent applications FR-A1-2 883 347, FR-A1-2 887 312 or US-A1-2006/0081439 illustrating such an element.

With such clutch release bearing devices, there are problems with the angular alignment of the axes of the bearing and of the diaphragm.

This impairs correct operation of these devices and reduces their service life, and may cause unpleasant sensations when releasing and engaging the clutch.

The present invention aims to remedy these drawbacks.

More particularly, the present invention aims to provide a clutch release bearing device in which the forces to be exerted on the clutch pedal are reduced when releasing the clutch and which is able to accommodate angular alignment errors of the axis of the bearing of the device and of that of the diaphragm of the control system of the associated clutch.

The aim of the present invention is also to provide a particularly economical device which is easy to manufacture and assemble.

SUMMARY OF THE INVENTION

The invention relates to a clutch release bearing device comprising a bearing provided with a fixed or non-rotating ring, a rotating ring and at least one row of rolling elements arranged between the rings, and a wear ring arranged on the rotating ring and capable of coming into contact with a clutch mechanism diaphragm. The wear ring comprises at least one ball joint bearing against a guide portion of the rotating ring and of which the rotational axis may be angularly tilted relative to the rotational axis of the bearing. The guide portion of the rotating ring or the ball joint is of generally spherical shape, of which the centre of the radius coincides with the rotational axis of the bearing. The wear ring comprises a guide portion provided with an internal surface in contact with an external bearing surface of the rotating ring. The wear ring also comprises the ball joint and joining portions connecting said guide portion and the ball joint and capable of permitting angular tilting of the ball joint relative to the guide portion.

The ball joint of the wear ring is movable in an angular or pivotable manner relative to the rotating ring, and more generally relative to the bearing, so as to be able to accommodate angular misalignment between the rotational axes of the bearing and of the diaphragm of the associated control system of the clutch. When mounting the bearing device onto the diaphragm, the ball joint of the wear ring may thus be self-aligned with the axis of said diaphragm.

Thus, the swivelling capacity of at least one part of the wear ring or of the entire wear ring on the rotating ring of the bearing makes it possible to obtain efficient operation of the clutch release bearing device, whilst reducing the forces to be exerted on the clutch pedal when releasing the clutch.

The wear ring comprises three separate parts, namely the ball joint, the guide portion and the joining portions. The guide portion is fixed to the rotating ring and the ball joint is mobile relative to said guide portion and to said ring due to the deformable joining portions.

In one embodiment, the joining portions form a divisible connection. Alternatively, the joining portions comprise flexible connections.

Advantageously, the device comprises axial retaining means for the wear ring on the rotating ring. The device may also comprise anti-rotation means for the wear ring relative to the rotating ring in the circumferential direction. The axial retaining means may also form the anti-rotation means. The axial retaining means or anti-rotation means may comprise a flange fixed to the rotating ring.

The wear ring may comprise a stiffening insert.

In one embodiment, the guide portion of the rotating ring extends obliquely in the direction of the fixed ring. Preferably, the guide portion has a concave surface on the side of the wear ring. The guide portion may form in cooperation with the fixed ring a narrow sealing passage.

In a further embodiment, the guide portion of the rotating ring extends obliquely on the side opposing the fixed ring. The guide portion may have a convex surface on the side of the wear ring.

The rotating ring may be the outer ring or the inner ring of the bearing.

In one embodiment, the guide portion and the rotating ring are made in one piece. Alternatively, the guide portion may be attached to the rotating ring.

The invention also relates to a clutch control system, comprising a clutch release fork, a clutch mechanism diaphragm and a clutch release bearing device as defined above.

BRIEF DESCRIPTION OF THE DRAWINGS

The present invention will be better understood on studying the detailed description of embodiments taken by way of non-limiting examples and illustrated by the appended drawings in which.

DETAILED DESCRIPTION OF THE PREFERRED EMBODIMENTS

Figure 1:
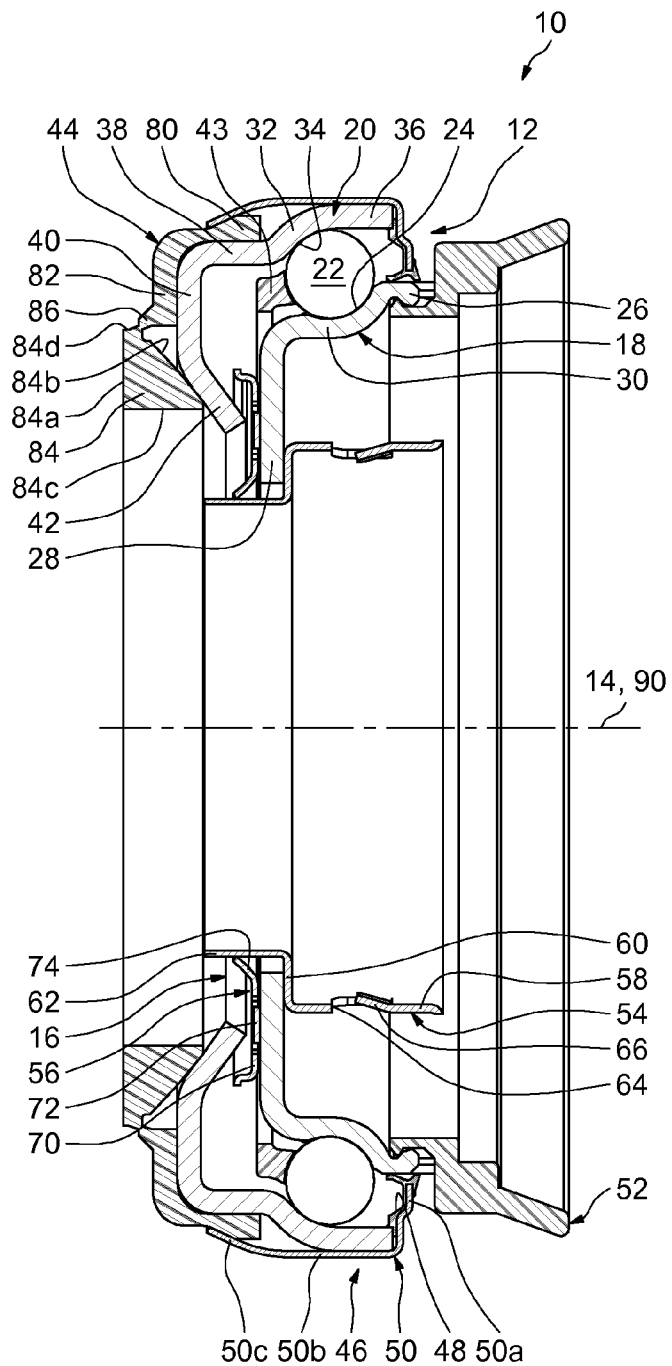
FIGS. 1 and 2 are views in axial section of a clutch release bearing device according to a first embodiment of the invention in the released state and in the mounted state, respectively.

In FIG. 1, a clutch release bearing device, referenced 10 in its entirety, essentially comprises a rolling bearing 12, with a rotational axis 14, and a means for axial fixing 16 provided between the rolling bearing 12 and an operating element (not shown) which may be a separate part from the control member activating the device or may form an integral part thereof. In the case of a hydraulic type bearing device, the operating element may, for example, be formed by the piston.

The rolling bearing 12 comprises an inner non-rotating ring 18 and an outer rotating ring 20 between which a row of rolling elements 22 is arranged, produced in this case in the form of balls. The thin-walled inner ring 18 may advantageously be produced by stamping a metal sheet or steel tube. It comprises a toroidal bearing race 24 for the rolling elements 22, having in cross section a concave internal profile in the shape of a quarter circle. The inner ring 18 also comprises an axial portion 26 and a radial portion 28 oriented towards the interior in the direction of the axis 14. Said axial 26 and radial 28 portions are arranged on both sides of the rolling elements 22 and connected to one another by a toroidal portion 30 comprising the bearing race 24. The axial portion 26 extends one edge of large diameter of the toroidal portion 30, and the radial portion 28 extends the toroidal portion 30 axially on the side opposing the axial portion 26.

The thin-walled outer ring 20 may also be advantageously produced by stamping a metal sheet or a steel tube. It comprises a toroidal portion 32 having in cross section a concave internal profile in the shape of a quarter circle forming a bearing track or race 34 for the rolling elements 22. The toroidal portion 32 is extended at each end by the axial portions 36, 38. The axial portion 36 radially surrounds the axial portion 26 of the inner ring 18. The axial portion 38 is offset axially towards the outside relative to the radial portion 28 of the inner ring 18. Axially on the side opposing the toroidal portion 32, the axial portion 38 is extended radially towards the inside by a radial portion 40, itself extended radially towards the inside in the direction of the radial portion 28 of the inner ring 18 by an oblique portion 42. The oblique portion 42 extends as far as the vicinity of the external surface of the radial portion 28 so as to be able to form therewith a narrow sealing passage.

The rolling bearing 12 further comprises a cage 43 for maintaining the uniform circumferential spacing of the rolling elements 22 arranged radially between the radial portion 28 of the inner ring 18 and the axial portion 38 of the outer ring 20.

The device 10 also comprises a thrust ring or wear ring 44 arranged against the external or outer surface of the outer ring 20 which is provided to cooperate by contact with a diaphragm (not shown) permitting the activation of a clutch mechanism or system, and capable of reducing the friction with the diaphragm and accommodating angular alignment errors between the axis 14 of the bearing and the axis of the diaphragm, as will be disclosed in more detail below.

The device 10 further comprises a sealing member 46, comprising a flexible part 48, for example made of elastomer, mounted in a sealed radial manner between the inner 18 and outer 20 rings, axially on the side opposing the cage 43, relative to the rolling elements 22. A first annular lip formed on the inner periphery of the flexible part 48 rubs against the external surface of the axial portion 26 of the inner ring 18 and a second annular lip formed on said inner periphery extends as far as the vicinity of said external surface so as to form upstream of the friction lip a narrow sealing passage.

The sealing member 46 is complemented by a flange 50 comprising a corrugated end 50a extending radially towards the interior in the direction of the axial portion 26 of the inner ring 18 and on which the flexible part 48 is overmoulded. The corrugated end 50a is extended in the region of one edge of large diameter by an annular axial portion 50b in contact with the external surface of the axial portion 36 of the outer ring 20, itself extended by a terminal edge 50c folded back onto the wear ring 44, for example by crimping. The terminal edge 50c provides the axial retention of the wear ring 44 on the outer ring 20, in addition to blocking in the circumferential direction.

A projection of the flexible part 48 from which the sealing lips are produced is axially prestressed between the radial end surface of the axial portion 36 of the outer ring 20 and the corrugated end 50a of the flange 50. This projection tends to adopt its initial dimensions again and to displace the flange 50 in the direction opposing the wear ring 44, which causes clamping of the terminal edge 50c on said wear ring by means of a resilient force. The axial retention of the wear ring 44 by the flange 50 is thus provided without the risk of taking up the clearance as the axial prestressing of the projection of the flexible part 48 arranged axially between said flange and the outer ring 20 makes it possible to avoid the presence of clearance between the wear ring and said outer ring.

The device 10 also comprises a hooking element 52 clipped onto the free end of the axial portion 26 of the inner ring 18 and provided to ensure the interface between a prestressed spring (not shown) of the device and the inner ring 18. In the case of a hydraulic-type bearing device, the spring provides the support of the device 10 in abutment against the diaphragm by means of a specific axial prestressing force outside periods of operation of the clutch, i.e. when there is no hydraulic pressure for activating said device.

The axial fixing means 16 is of the type permitting a specific radial displacement of the inner ring 18 relative to the operating element. The axial fixing means 16 comprises a retaining ring 54 and a resilient self-alignment member 56 separate from one another.

The retaining ring 54 is in the form of a one-piece annular part, made of sheet metal and having a shape which corresponds with one end of the operating element. It comprises a first axial annular portion 58, a radial annular portion 60, extending to the inside and a second axial annular portion 62 connected to the first axial portion 58 by said radial portion 60. The radial portion 60 is in contact with the radial portion 28 of the inner ring 18 axially on the side opposing the self-alignment member 56. The axial portion 58 extends opposite said radial portion 28, remaining axially retracted relative to the hooking element 52. The axial portion 58 has a diameter which is greater than the minimum diameter of the inner ring 18 at the free end of the radial portion 28.

A plurality of U-shaped apertures 64 are formed in the axial portion 58 by cutting, allowing tabs 66 to remain having a certain radial elasticity and folded obliquely towards the inside. The axial portions 58, 62 are provided to permit the mounting of the operating element, said element also coming to bear against the radial portion 60. The radial portion 60 thus transmits the axial forces between the operating element and the inner ring 18. The tabs 66 are capable of projecting into a groove formed on the operating element and thus capable of providing the axial fixing of the retaining ring 54 and of said operating element.

The axial portion 62 has an external diameter which is less than the minimum diameter of the inner ring 18 taken at the free end of the radial portion 28. This difference in diameter permits a certain radial displacement of the rolling bearing 12 relative to the operating element and thus permits the radial self-alignment of the axis 14 relative to the axis of the clutch diaphragm, this self-alignment being maintained by friction between the inner ring 18 and the retaining ring 54 under the action of the self-alignment member 56.

The self-alignment member 56 is arranged about the axial portion 62 of the retaining ring 54 and axially between the radial portion 28 of the inner ring 18 and the oblique portion 42 of the outer ring 20. The self-alignment member 56, which is of generally annular shape, comprises a radial portion 70 from which a plurality of resilient tabs 72 are made by cutting, and arranged in the circumferential direction, and which are axially flexible and bear against the radial portion 28 of the inner ring 18 axially on the side opposing the radial portion 60 of the retaining ring 54.

The radial portion 70 is extended towards the inside by hooking lugs 74 which are cut out, and which are oblique and extend radially towards the inside and axially on the side opposing the radial portion 28 of the inner ring 18. The hooking lugs 74 exert radial prestressing on the axial portion 62 of the retaining ring 54 and prevent, by a locking effect, a movement of the inner ring 18 in the direction of the diaphragm. The self-alignment member 56 is fixed to the retaining ring 54 radially and axially, at least in the dismantling direction, due to the hooking lugs 74.

During operation, the rolling bearing 12 may be radially self-aligned relative to the operating member as a result of the clearance present between the free end of the radial portion 28 of the inner ring 18 and the axial portion 62 of the retaining ring 54. The self-alignment member 56 exerts a uniform axial prestressing force on the inner ring 18 by means of the hooking lugs 74. An axial force exerted on the self-alignment member 56 in the direction opposing the radial portion 60 of the bearing ring 58 tends to cause the locking of the hooking lugs 74 between the axial portion 62 and the radial portion 70. The stresses which result are absorbed by the radial portion 70 and remain on the resilient tabs 72 without having any effect. Conversely, the hooking lugs 74 are not deformed by the stresses exerted by the resilient tabs 72 which are absorbed by the radial portion 70.

The annular thrust ring or wear ring 44 is advantageously made in one piece by moulding from a synthetic material, for example a polyamide containing mineral or carbon fibres. It comprises an annular axial guide portion 80 radially surrounding the axial portion 38 of the outer ring 20 and extended radially to the inside by an annular radial portion 82 bearing against the external surface of the radial portion 40 of said ring.

The guide portion 80 is provided with a cylindrical internal or inner surface in contact with the external surface of the axial portion 38, permitting the positioning of the wear ring 44 on the outer ring 20 by a simple axial movement which is easy to automate. The guide portion 80 comprises an external surface which is inclined relative to the axis 14 of the bearing device having a diameter which is less on the side of the diaphragm than on the side of the rolling elements 22 and onto which the terminal end 50c of the flange 50 is crimped.

The wear ring 44 also comprises an annular body or washer forming a ball joint 84 partially bearing against the external surface of the oblique portion 42 of the outer ring 20 and connected to the lower end of the radial portion 82 by means of projections 86. The projections 86 are in this case three in number and spaced uniformly apart in the circumferential direction. Each projection 86 has a section which decreases from the radial portion 82 towards the ball joint 84 and which is adapted so that said ball joint may be released from the radial portion 82 when the device 10 comes to bear against the diaphragm as will be disclosed in more detail below.

The ball joint 84 comprises a radial surface 84a provided to cooperate by contact with the diaphragm and an opposing convex surface 84b which bulges slightly to match the shape and to come into contact with the external concave surface of the oblique portion 42 of the outer ring 20. When mounting the wear ring 44 on the outer ring 20, the oblique portion 42 permits the centring of the ball joint 84 on said ring. The convex surface 84b defines a spherical portion of which the centre coincides with the axis 14 of the bearing and is offset axially towards the outside relative to the radial surface 84a. An axial annular space is formed between one part of the convex surface 84b and the radial portion 40 of the outer ring 20. The ball joint 84b also comprises an axial bore 84c having a diameter which is greater than the diameter of the bore of the oblique portion 42 and an external surface 84d connected to the projections 86.

As illustrated in FIG. 1, in a neutral position of the device 10, before mounting onto the diaphragm of the clutch system, the axis 90 of the ball joint 84 is coaxial with the axis 14 of the rolling bearing 12 and more generally of the device 10.

When the device 10 is positioned against the diaphragm with an axial preload, the ball joint 84 makes it possible to accommodate angular alignment errors existing between the axis 14 of the rolling bearing and the axis of the diaphragm.

Figure 2:
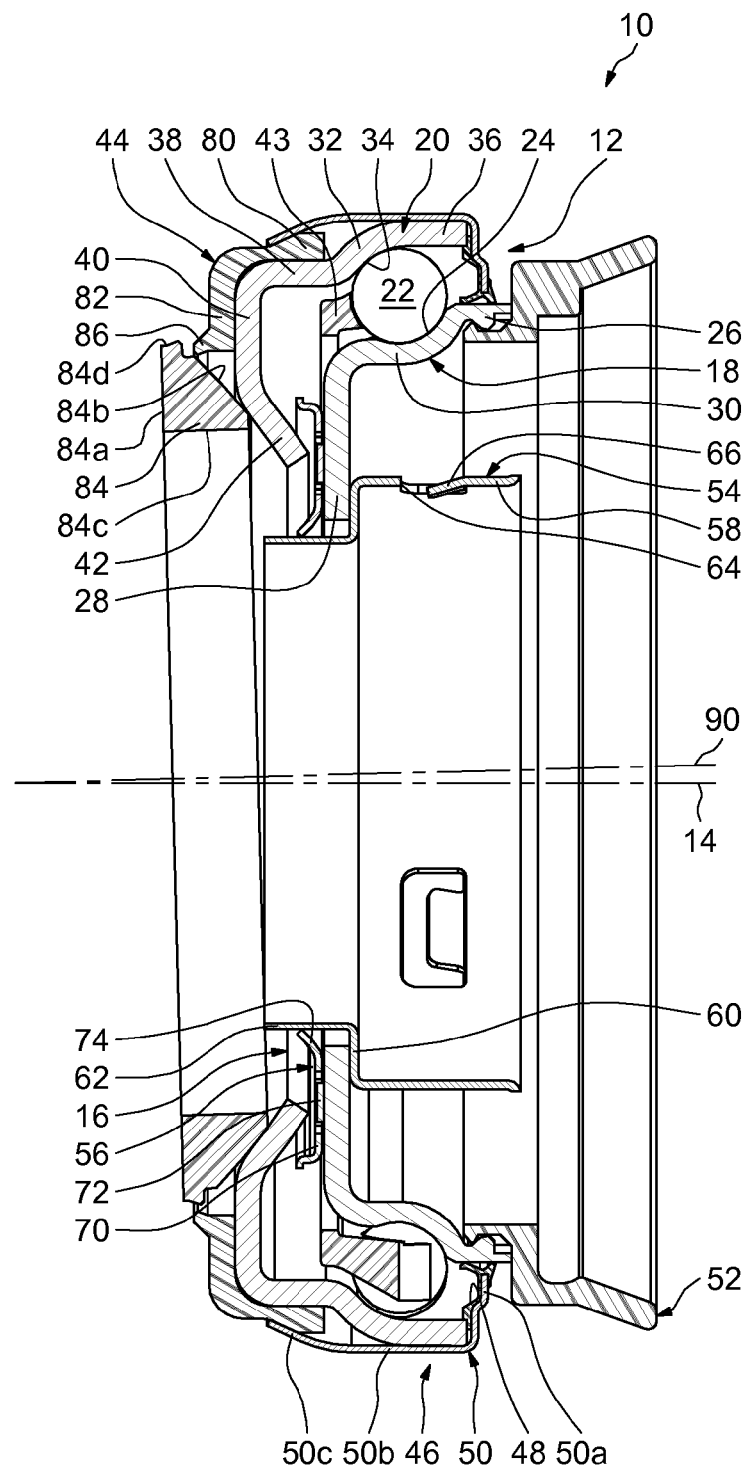

More specifically, during contact between the diaphragm and the radial bearing surface 84a of the wear ring 44, the ball joint 84 may tilt at an angle relative to the axis 14 of the rolling bearing 12 so that its axis 90 is aligned with the axis of the diaphragm. On FIG. 2, the axis 90 of the ball joint 84 is misaligned at an angle relative to the axis 14 in the anti-clockwise direction, but remaining in the same radial plane. Naturally, the ball joint 84 may also be tilted in the clockwise direction. The angular tilting of the axis 90 relative to the axis 14 is, for example, less than 3°.

When the ball joint 84 is tilted at an angle as a result of the contact with the diaphragm and the axial preload, the projections 86 break in the region of their section which has the smallest diameter permitting said ball joint to be detached from the remainder of the wear ring 54. The projections 86 form a divisible connection. The ball joint 84 housed partially in the oblique portion 42 of the outer ring 20 may pivot inside said outer ring, whilst remaining partially in contact with the external surface of said portion. The oblique portion 42 thus provides a centring function of the wear ring 44 when mounted on the outer ring 20 and a guide function of the ball joint 84 when tilted, when the device 10 is positioned onto the diaphragm.

The capacity for part of the wear ring 44 to swivel relative to the outer rotating ring 20, and more generally relative to the rolling bearing 12, permits the angular self-alignment of the axis 90 of the ball joint 84 on the axis of the diaphragm and thus for the angular misalignment between the axis of said diaphragm and the axis 14 to be accommodated.

Figure 3:
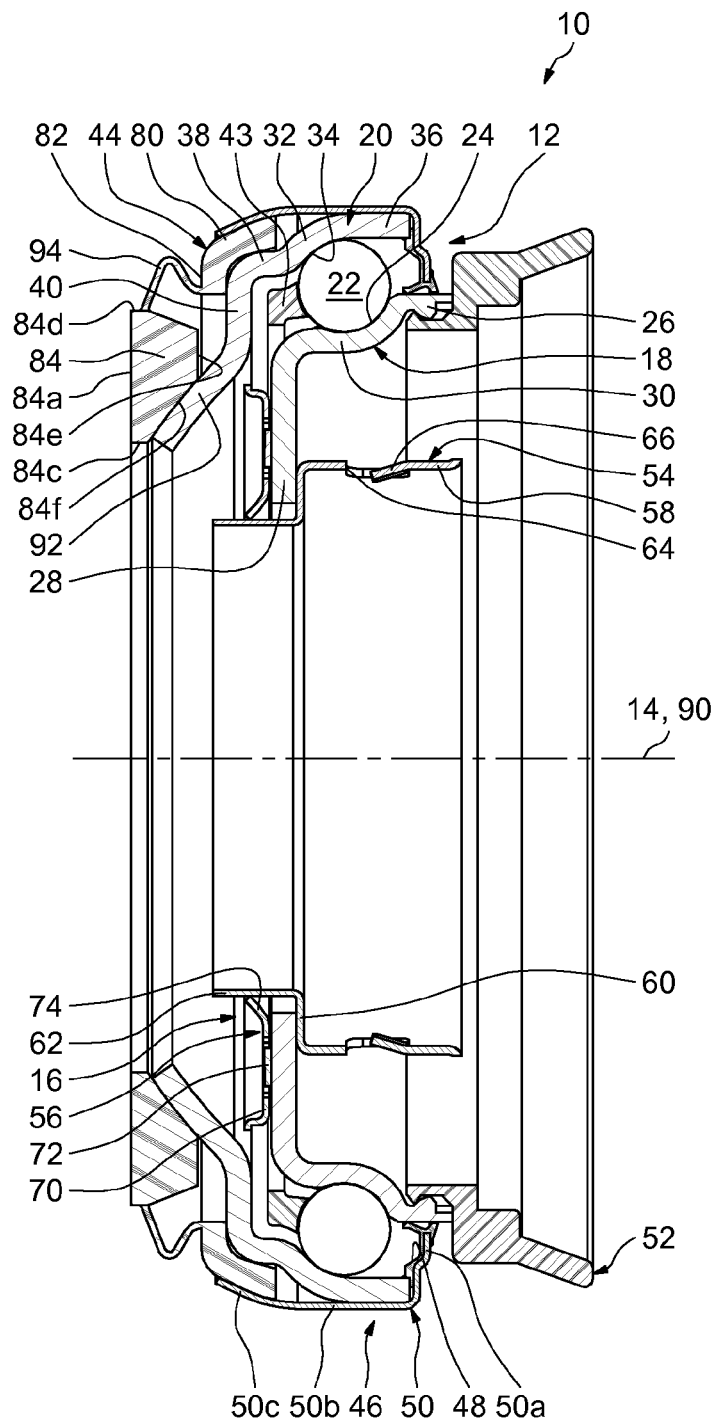
FIGS. 3 and 4 are views in axial section of a clutch release bearing device according to a second embodiment of the invention in the released state and in the mounted state, respectively.
Figure 4:
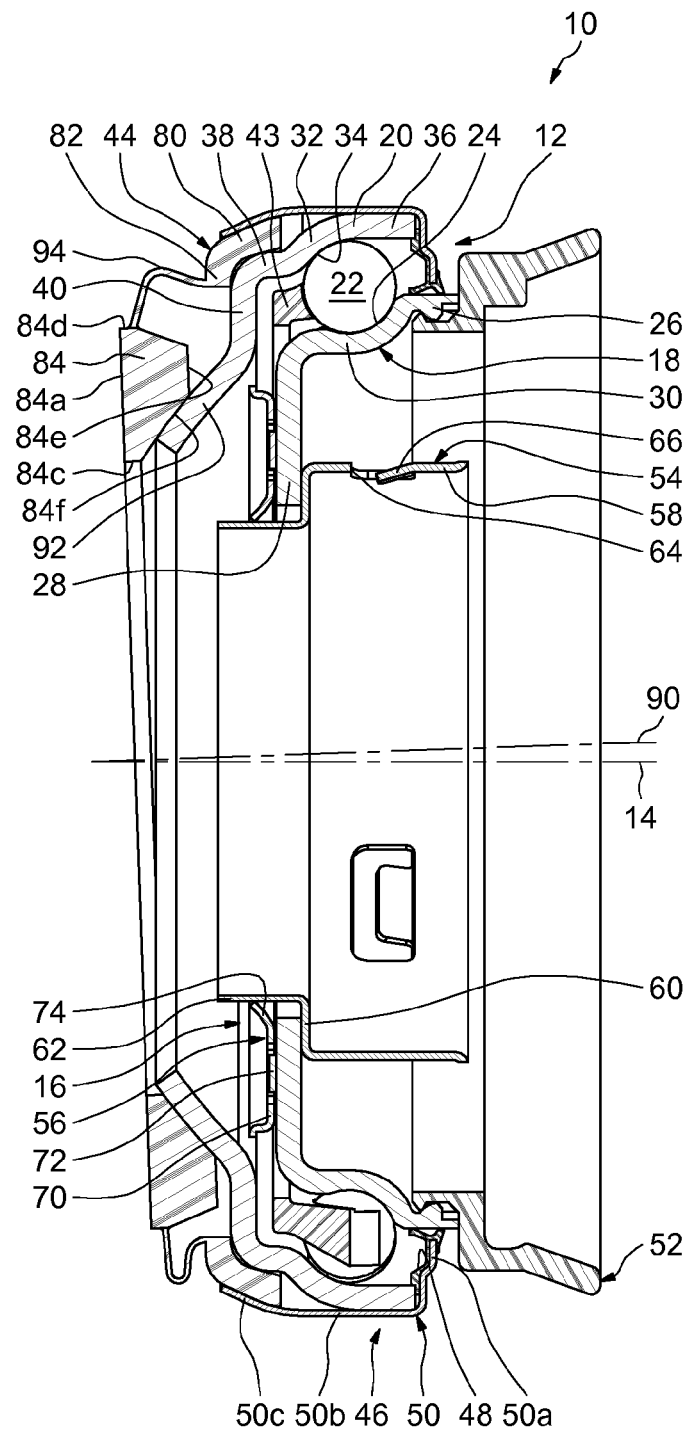

The embodiment illustrated in FIGS. 3 and 4 in which identical elements bear the same reference numerals, differs in that the radial portion 40 of the outer ring 20 is extended radially to the inside by an oblique portion 92 extending obliquely to the outside of the device 10, i.e. axially on the side opposing the radial portion 28 of the inner ring 18. The external surface of the oblique portion 92 is convex and defines a spherical portion of which the centre coincides with the axis 14 of the bearing and is offset axially to the inside relative to the radial portion 28 of the inner ring 18. The axial distance separating the cage 43 and the portion 40 of the outer ring 20 is reduced here relative to the embodiment described above.

The ball joint 84 of the wear ring 44 comprises a radial surface 84e opposing the radial surface 84a and opposite the radial portion 40 of the outer ring 20. The radial surface 84e is extended downwards by a concave surface 84f which matches the shape and is in contact with the external convex surface of the oblique portion 92 of the outer ring 20. The edge of the concave surface 84f which has a small diameter is flush with the bore 84c. In this case, the bore 84c has a diameter which is substantially equal to the diameter of the bore of the oblique portion 92.

Between the radial portion 82 and the external surface 84d of the ball joint 84, flexible connections 94 are provided in order to be able to achieve pivoting or articulation of the ball joint 84 on the oblique portion 92 and an angular misalignment of the axis 90 relative to the axis 14. The connections 94 are in this case two in number and diametrically opposed.

In this embodiment, when tilting the ball joint 84 relative to the remainder of the wear ring 44 and the outer ring 20, there is no detachment or loosening of said ball joint 84 relative to the radial portion 82 but simply deformation of the flexible connections 94.

In the two embodiments disclosed, the wear ring 44 is made in one piece by moulding from a single synthetic material. Alternatively, it is also possible to produce the wear ring 44 in a single piece by overmoulding inside the same mould a second synthetic material on the synthetic material which is used to obtain the ball joint 84.

Figure 5:
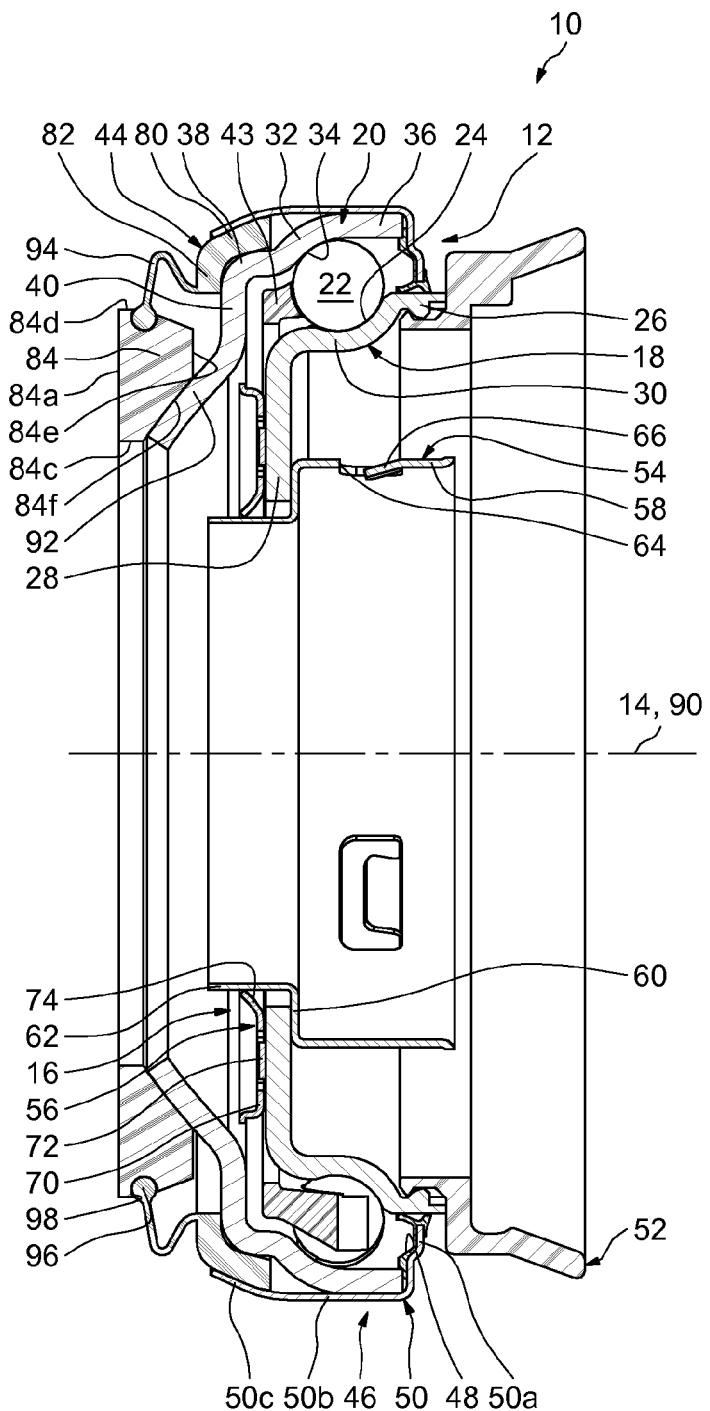
FIG. 5 is a view in axial section of a clutch release bearing device according to a third embodiment of the invention in the released state.

The variant illustrated in FIG. 5, in which identical elements bear the same reference numerals, differs from the embodiment disclosed above in that the guide portion 80, the radial portion 82 and the connections 94 are moulded separately from the ball joint 84 in two separate moulds. To permit the fixing of the ball joint 84 relative to the remainder of the wear ring 44, the connections 94 each comprise at the end thereof a spherical projection 96, which is provided to be housed by wedging in a recess 98 of corresponding shape formed on the external surface 84d of the ball joint 84.

In all the embodiments disclosed above, the outer ring 20 is rotatable and the inner ring 18 is fixed. As a variant, it is naturally possible to provide a rotating inner ring and a fixed outer ring.

As a result of the invention, a clutch release bearing device is provided which is able to accommodate angular misalignment errors between the axis of the bearing of the device and the axis of the clutch diaphragm due to the tilting or swivelling of at least one part of the wear ring relative to the rotating ring of the rolling bearing, which increases the reliability of the device.

The invention claimed is:

1. A clutch release bearing device comprising:
a bearing provided with a non-rotating ring;
a rotating ring and at least one row of rolling elements arranged between the non-rotating ring and the rotating ring, the rotating ring comprising an oblique portion having an external surface; and
a wear ring arranged on the rotating ring and capable of coming into contact with a clutch mechanism diaphragm, the wear ring comprising an annular body having an inner surface bearing against the external surface of the oblique portion of the rotating ring and having an axis that may be angularly tilted relative to an axis of the bearing,
wherein the wear ring further comprises a guide portion having an internal surface in contact with an external bearing surface of the rotating ring and joining portions connecting the guide portion with the annular body, wherein the annular body can angularly tilt relative to the guide portion.

2. The clutch release bearing device to claim 1, wherein the joining portions form a divisible connection.

3. The clutch release bearing device according to claim 1, wherein the joining portions comprise flexible connections.

4. The clutch release bearing device according to claim 1, further comprising axial retaining means of the wear ring on the rotating ring.

5. The clutch release bearing device according to claim 1, further comprising anti-rotation means of the wear ring relative to the rotating ring in the circumferential direction.

6. The clutch release bearing device according to claim 4, wherein the axial retaining means comprise a flange fixed to the rotating ring.

7. The clutch release bearing device according to claim 1, wherein the oblique portion of the rotating ring extends obliquely in the direction of the non-rotating ring.

8. The clutch release bearing device according to claim 1, wherein the external surface of the oblique portion of the rotating ring is a concave surface.

9. The clutch release bearing device according to claim 1, wherein the oblique portion of the rotating ring forms in cooperation with the non-rotating ring a narrow passage.

10. The clutch release bearing device according to claim 1, wherein the oblique portion of the rotating ring extends obliquely away from the non-rotating ring.

11. The clutch release bearing device according to claim 10, wherein the guide portion of the rotating ring has a convex surface on the side of the wear ring.

12. The clutch release bearing device according to claim 1, wherein the rotating ring is an outer ring of the bearing.

13. The clutch release bearing device according to claim 10, wherein the external surface of the oblique portion is a convex surface and the inner surface of the annular body is a concave surface.

14. The clutch release bearing device according to claim 1, wherein the inner surface of the annular body moves relative to the external surface of the oblique portion when the annular body is angularly tilted relative to the guide portion.

15. The clutch release bearing device according to claim 1, wherein the joining portions has a thickness that is less than a thickness of the annular body.

* * * * *